W. A. GIESE.
CUSHIONED WHEEL.
APPLICATION FILED AUG. 25, 1917.

1,262,941. Patented Apr. 16, 1918.

Inventor
W. A. GIESE
By Watson E. Coleman
Attorney

UNITED STATES PATENT OFFICE.

WILLIAM A. GIESE, OF EDGAR, WISCONSIN.

CUSHIONED WHEEL.

1,262,941.  Specification of Letters Patent.  Patented Apr. 16, 1918.

Application filed August 25, 1917. Serial No. 188,173.

*To all whom it may concern:*

Be it known that I, WILLIAM A. GIESE, a citizen of the United States, residing at Edgar, in the county of Marathon and State of Wisconsin, have invented certain new and useful Improvements in Cushioned Wheels, of which the following is a specification, reference being had to the accompanying drawings.

This invention relates to cushioned wheels, and particularly to that form of cushioned wheel in which the tread is provided with cushioned tread members designed to shift according to the irregularities of the road and resiliently take up shock.

The general object of the invention is to provide a very simple and effective cushioned wheel of the type above described, which type of wheel may take the place of wheels having solid rubber tires on trucks or tractors.

A further object of the invention is to provide a wheel with a plurality of circumferentially extending tread elements, the tread elements being to a certain extent independent of each other and being yieldingly forced outward but capable of moving inward against the strength of springs and the tread elements being resiliently connected to each other so as to secure a unitary movement of the tread elements.

Other objects will appear in the course of the following description.

My invention is illustrated in the accompanying drawings, wherein:—

Figure 1:
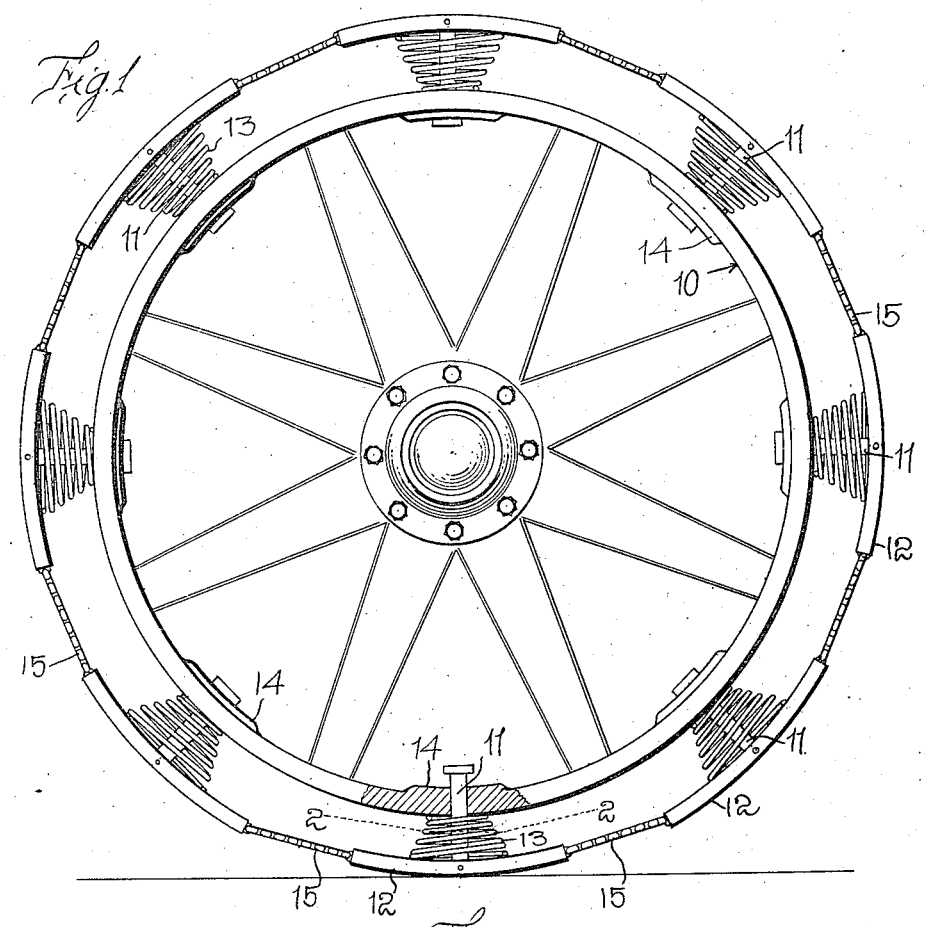
Figure 2:
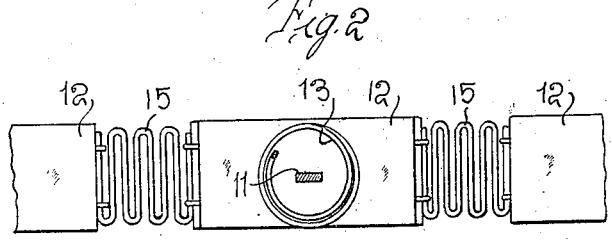

Figure 1 is a side elevation of a wheel constructed in accordance with my invention; and Fig. 2 is a section on the line 2—2 of Fig. 1.

Referring to these drawings, 10 designates the rim of a vehicle wheel. This rim may be formed as the felly of the wheel or as a separate rim being disposed upon the wheel and removable therefrom. Extending radially through the rim at predetermined distances are a plurality of pins or bolts 11, which have sliding independent longitudinal movement in and through the rim 10. The outer ends of the bolts are reduced and pivotally connected to the reduced end of each bolt is a tread plate 12, which is rectangular in form, slightly curved and is relatively thick and heavy depending upon the load to be carried. Surrounding each pin or bolt 11 and disposed between the rim and the tread plate is a coiled compression spring 13, this spring being tapered inward, that is the coils gradually decreasing in diameter from the outer coil inward. Preferably the rim 10 is reinforced at 14 where the bolt or pin passes through it. Connecting the tread plates are the contractile springs 15 which may be of any suitable form, but are shown as formed by taking a strip of spring material and bending it back and forth so as to provide a plurality of parallel convolutions, the ends of the spring being attached to the two adjacent end plates.

In the practical use of this invention, it will be obvious that as the wheel rotates over the ground, the individual tread elements will yield to the contour of the ground, the springs 13 resisting such yielding movement. When the wheel strikes a stone, for instance, the individual tread element so struck would yield and swing and the coacting spring would take up the jar. When the end of the tread element strikes a stone or a rut, it will move inward and stretch the corresponding spring 15 and when any one of the springs 15 strike a stone or other protuberant object, the spring will simply stretch and when the wheel has passed over will return to its normal position again. It will be seen that a wheel construction of this character is particularly effective for trucks or other power propelled vehicles designed for heavy work and that it is also well adapted for tractors where the tread elements would be forced into the road so as to secure a good tractive effect. It will also be obvious that the principle of my invention may be embodied in many different forms, without departing from the spirit thereof.

Having described my invention what I claim is:—

A vehicle wheel comprising a rim, a plurality of radially disposed guiding and supporting members slidably mounted in the rim, a plurality of circumferentially extending tread plates, each pivotally mounted upon the outer end of one of the guiding and supporting members, resilient connections between the tread plates comprising each a transversely folded spring having a width approximately equal to the width of the tread plates, each spring being pivotally connected to the ends of adjacent tread plates, and means resiliently urging the tread plates radially outward.

In testimony whereof I hereunto affix my signature in the presence of two witnesses.

WILLIAM A. GIESE.

Witnesses:
ALBERT J. PISCHKE,
EMIL ZENK.

Copies of this patent may be obtained for five cents each, by addressing the "Commissioner of Patents, Washington, D. C."